(12) United States Patent
Sumioka et al.

(10) Patent No.: US 6,741,794 B1
(45) Date of Patent: May 25, 2004

(54) SYSTEM AND METHOD FOR FLEXIBLY BLENDING MULTIPLE IMAGE PLANES IN A VIDEO DEVICE

(75) Inventors: Tetsuji Sumioka, Kawasaki (JP); Shirish Gadre, San Jose, CA (US); Tomonari Tohara, Foster City, CA (US); Fay Massian, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/240,098

(22) Filed: Jan. 29, 1999

(51) Int. Cl.$^7$ ................................................. H04N 5/91
(52) U.S. Cl. ........................ 386/95; 386/125; 386/126
(58) Field of Search ...................... 386/46, 95, 102, 386/125, 126; 348/565, 578, 585

(56) References Cited

U.S. PATENT DOCUMENTS

| | | | |
|---|---|---|---|
| 4,254,434 A | 3/1981 | Suzuki | 358/147 |
| 4,360,831 A * | 11/1982 | Kellar | 348/585 |
| 4,953,035 A * | 8/1990 | Yoshio | 386/95 |
| 5,353,068 A | 10/1994 | Moriwake | 348/585 |
| 5,486,872 A * | 1/1996 | Moon | 348/564 |
| 5,726,715 A | 3/1998 | Endress | 348/565 |
| 5,841,483 A * | 11/1998 | Shafer | 348/565 |
| 6,195,087 B1 * | 2/2001 | Wu | 345/213 |
| 6,385,388 B1 * | 5/2002 | Lewis et al. | 386/46 |

FOREIGN PATENT DOCUMENTS

EP    0840505 A2 *    5/1996

* cited by examiner

*Primary Examiner*—Huy Nguyen
(74) *Attorney, Agent, or Firm*—Gregory J. Koerner; Simon & Koerner LLP (57) ABSTRACT

A system and method for flexibly blending multiple image planes in a video device comprises a timing controller configured to generate adjusted synchronization signals for pretiming multiple video image planes. The timing controller preferably generates the adjusted synchronization signals in response to programmable delay signals and a master synchronization signal. A blender device then receives and flexibly combines the multiple video image planes to generate a synchronized composite blender output signal. The blender preferably includes a selectable pseudo-output signal that may be routed through an external processing device, and returned as a feedback loop to an external input of the blender device.

35 Claims, 9 Drawing Sheets

SYSTEM AND METHOD FOR FLEXIBLY BLENDING MULTIPLE IMAGE PLANES IN A VIDEO DEVICE

BACKGROUND OF THE INVENTION

1. Field of the Invention

This invention relates generally to video processing techniques, and relates more particularly to a system and method for flexibly blending multiple image planes in a video device.

2. Description of the Background Art

Implementing flexible and efficient methods for manipulating video data is a significant consideration of designers, manufacturers, and users of contemporary video devices. Video technology continues to evolve in response to a variety of converging factors such as marketplace competition and user demand for increased functionality. One aspect of the foregoing video evolution process has been a substantial increase in the relative complexity and system capabilities of various modern video devices.

For example, a digital video disc device may be utilized to view high-quality recorded audio-visual materials, such as motion pictures and other types of entertainment or educational programs. Similarly, a digital video broadcast system may provide high-quality programs for reproduction and viewing on a corresponding electronic playback system. The foregoing advanced digital video formats may provide additional functionality that was unavailable in earlier versions of electronic programming.

Many digital video encoding formats enable the inclusion of one or more subsidiary sets of displayable program information, in addition to the primary video program that typically includes video data for display to a system viewer. For example, one subsidiary set of video program information may include subtitles in a language other than that of the primary video program.

Simultaneously displaying multiple sets of video program information on a display monitor may present a variety of challenges to a system designer. In order to optimize the functionality of a video system that simultaneously displays multiple sets of program information, a video system may significantly benefit from a flexible and efficient design. For example, the ability to flexibly select, manipulate and blend a number of diverse video sources or image planes may provide significant benefit to users of video devices. Furthermore, the importance of system flexibility becomes accentuated when the number of video data sets or image planes increases.

Another concern associated with flexibly manipulating and blending multiple image planes of video information is the successful and accurate timing of each of the various image planes to achieve synchronicity when simultaneously displaying the image planes on a display monitor. Failure to correctly time each of the image planes may result in significant display offsets of the image planes in relation to other displayed image planes.

Therefore, for all the foregoing reasons, implementing an efficient method for flexibly blending multiple image planes of video data remains a significant consideration of designers, manufacturers, and users of contemporary video devices.

SUMMARY OF THE INVENTION

In accordance with the present invention, a system and method for flexibly blending multiple image planes in a video device is disclosed. In one embodiment, a timing controller initially accesses and references a master horizontal synchronization (hsync) signal. However, in alternate embodiments, various other signals may readily be utilized by timing controller as a reference. The timing controller then preferably receives a PF delay signal, an SP delay signal, and an OSD delay signal, however, in other embodiments, the timing controller may readily receive various other additional or different programmable delay signals.

Next, the timing controller preferably references the master hsync signal and responsively generates reshaped or adjusted hsync signals corresponding to the received delay signals. Specifically, the timing controller generates a PF hsync signal in response to a PF delay signal, an SP hsync signal in response to a SP delay signal, and an OSD hsync signal in response to an OSD delay signal. The timing controller then preferably provides the adjusted hsync signals to corresponding signal generation modules. More specifically, the timing controller provides the PF hsync signal to a postprocessing filter, the SP hsync signal to a subpicture decoder, and the OSD hsync signal to an OSD engine. In alternate embodiments, the adjusted synchronization signals may readily be provided to various other modules and devices, in accordance with the present invention.

Next, the postprocessing filter pre-synchronizes a PF video signal using the received PF hsync signal. Similarly, the subpicture decoder pre-synchronizes an SP video signal using the received SP hsync signal. Also, the OSD engine pre-synchronizes an OSD video signal using the received OSD hsync signal. The postprocessing filter then provides the pre-synchronized PF video signal to a blender device. The subpicture decoder similarly provides the pre-synchronized SP video signal to the blender device. Also, the OSD engine provides the pre-synchronized OSD video signal to the blender device.

In one embodiment of the present invention, the blender device responsively selects between the PF video signal and an external PDI signal to generate a selector A output signal. The blender device then blends the selector A output signal and the SP video signal in response to configurable blend factors to generate a mixer A output signal. Next, the blender device preferably selects between the mixer A output signal and the external PDI signal to generate a selector D output signal.

The blender device then preferably blends the selector D output signal and a mask video signal in response to configurable blend factors to generate a mixer B output signal. Next, the blender device preferably selects between the OSD video signal and the external PDI signal to generate a selector C output signal. Then, the blender device blends the mixer B output signal and the selector C output signal in response to configurable blend factors to generate a synchronized blender output signal, in accordance with the present invention. Finally, the blender device preferably selects between the PF video, the mixer A output signal, and the blender output signal to generate a pseudo output signal (PDO).

In alternate embodiments of the present invention, the foregoing blender device may readily perform processes and techniques that are different from, in addition to, or in varying order from those disclosed in conjunction with the foregoing embodiment. The present invention thus effectively implements a system and method for flexibly blending multiple image planes in a video device.

DETAILED DESCRIPTION OF THE PREFERRED EMBODIMENT

The present invention relates to an improvement in electronic systems for manipulating video data. The following description is presented to enable one of ordinary skill in the art to make and use the invention, and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for flexibly blending multiple image planes in a video device, and includes a timing controller configured to generate adjusted synchronization signals for pretiming multiple video image planes. The timing controller preferably generates the adjusted synchronization signals in response to programmable delay signals and a master synchronization signal.

A blender device then receives and flexibly combines the multiple video image planes to generate a synchronized composite blender output signal. The blender preferably includes a selectable pseudo-output signal that may be routed through an external processing device, and returned as a feedback loop to an external input of the blender device.

Figure 1:
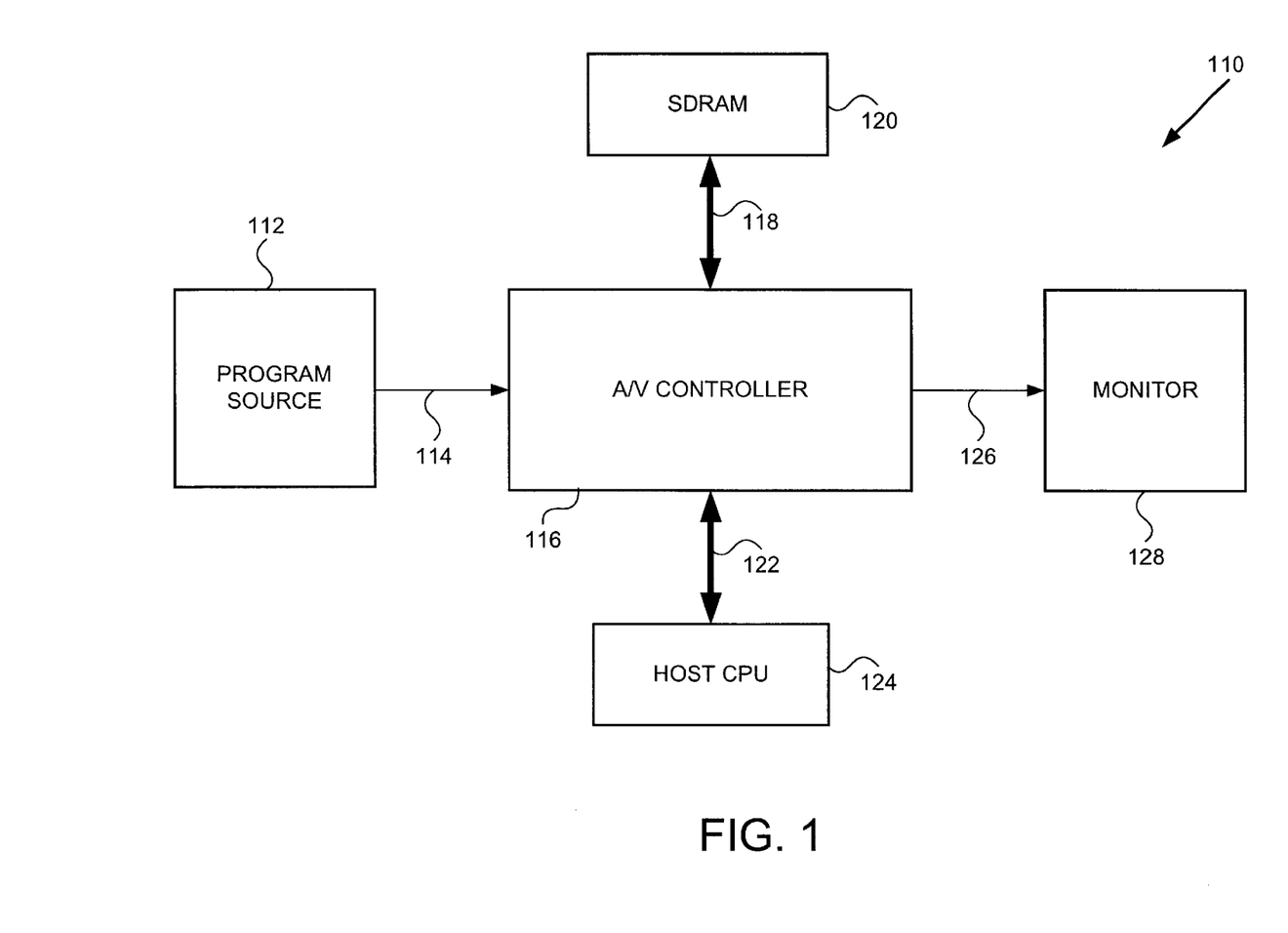
FIG. 1 is a block diagram of one embodiment for an audio/video system, in accordance with the present invention.

Referring now to FIG. 1, a block diagram of one embodiment for an audio/video (A/V) system 110 is shown, in accordance with the present invention. A/V system 110 of FIG. 1 preferably includes a program source 112, an audio/video (A/V) controller 116, a synchronous dynamic random-access memory (SDRAM) 120, a host central processing unit (CPU) 124, and a monitor 128.

In the operation of A/V system 110, program source 112 initially provides source data to audio/video (A/V) controller 116 via line 114. In the FIG. 1 embodiment, the source data is preferably digital audio and digital video data, and program source 112 is preferably an audio/video reproduction device, such as a digital video disc player. However, in other embodiments, the source data may include any other type of data, and program source 112 may include any other type of appropriate and compatible data source.

In the FIG. 1 embodiment, A/V controller 116 preferably communicates with SDRAM 120 via path 118, and also communicates with the host CPU 124 (processor) via path 122. In operation, A/V controller 116 manipulates and processes the source data received from program source 112, and then provides the resulting processed data to monitor 128 via line 126 for utilization by a user of A/V system 110.

Figure 2:
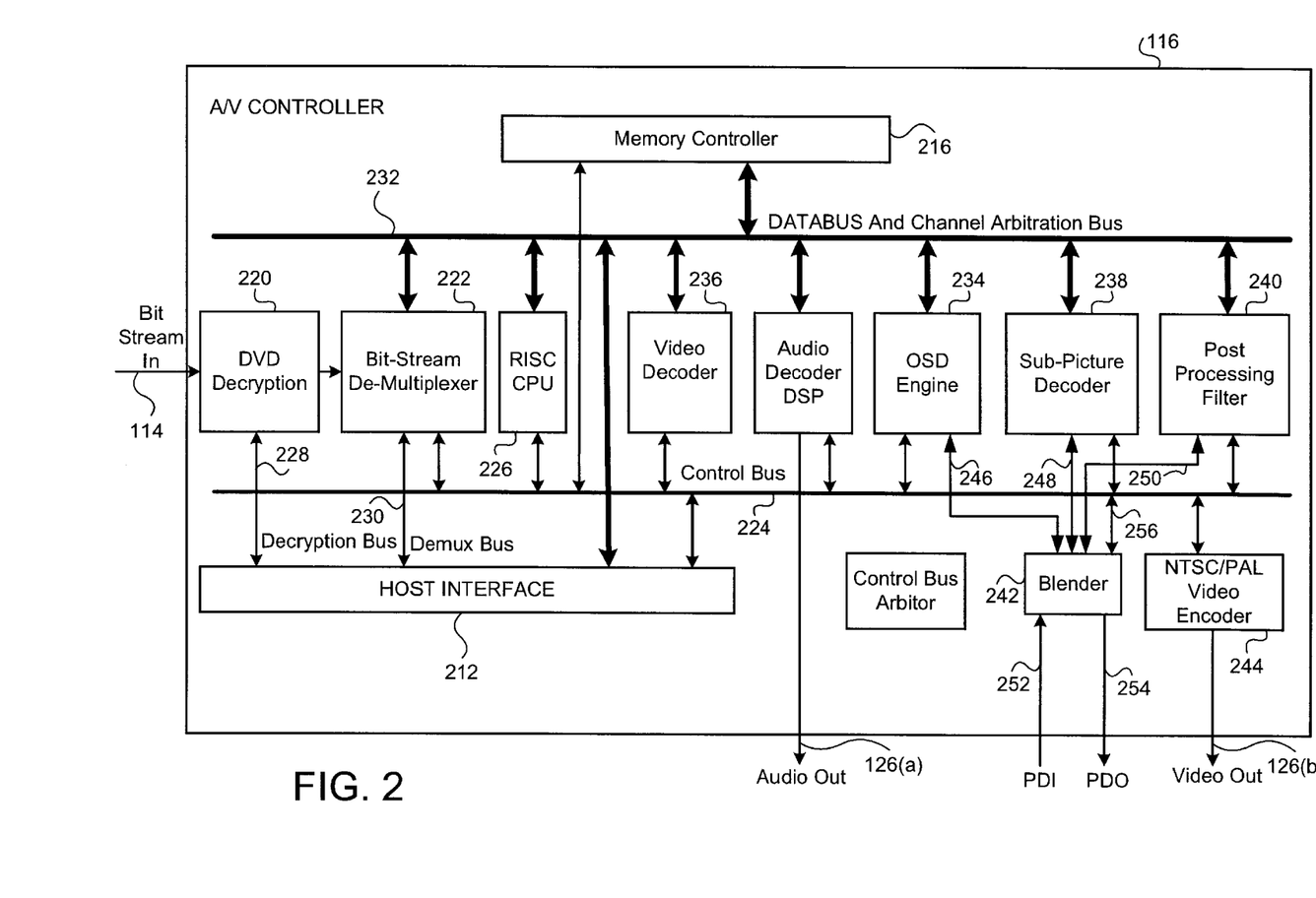
FIG. 2 is a block diagram of one embodiment for the A/V controller of FIG. 1, in accordance with the present invention.

Referring now to FIG. 2, a block diagram of one embodiment for the FIG. 1 A/V controller 116 is shown, in accordance with the present invention. In the FIG. 1 embodiment, A/V controller 116 includes, but is not limited to, a host interface 212, a memory controller 216, a DVD decryption module 220, a bit-stream demultiplexer 222, a reduced instruction-set controller central processing unit (RISC CPU) 226, a control bus 224, a databus 232, a video decoder 236, an on-screen display (OSD) engine 234, a subpicture decoder 238, a postprocessing filter 240, a blender 242, and a video encoder 244.

In practice, the FIG. 2 A/V controller 116 receives source data (bitstream in) from program source 112 via line 114. A/V controller 116 responsively processes and decodes the source data to produce six channels of audio (audio out) on line 126(a). A/V controller 116 also processes and decodes the source data to produce six channels of video (video out) on line 126(b). A/V controller 116 then preferably provides the audio out signals and the video out signals to monitor 128 (FIG. 1) for playback reproduction.

Figure 3:
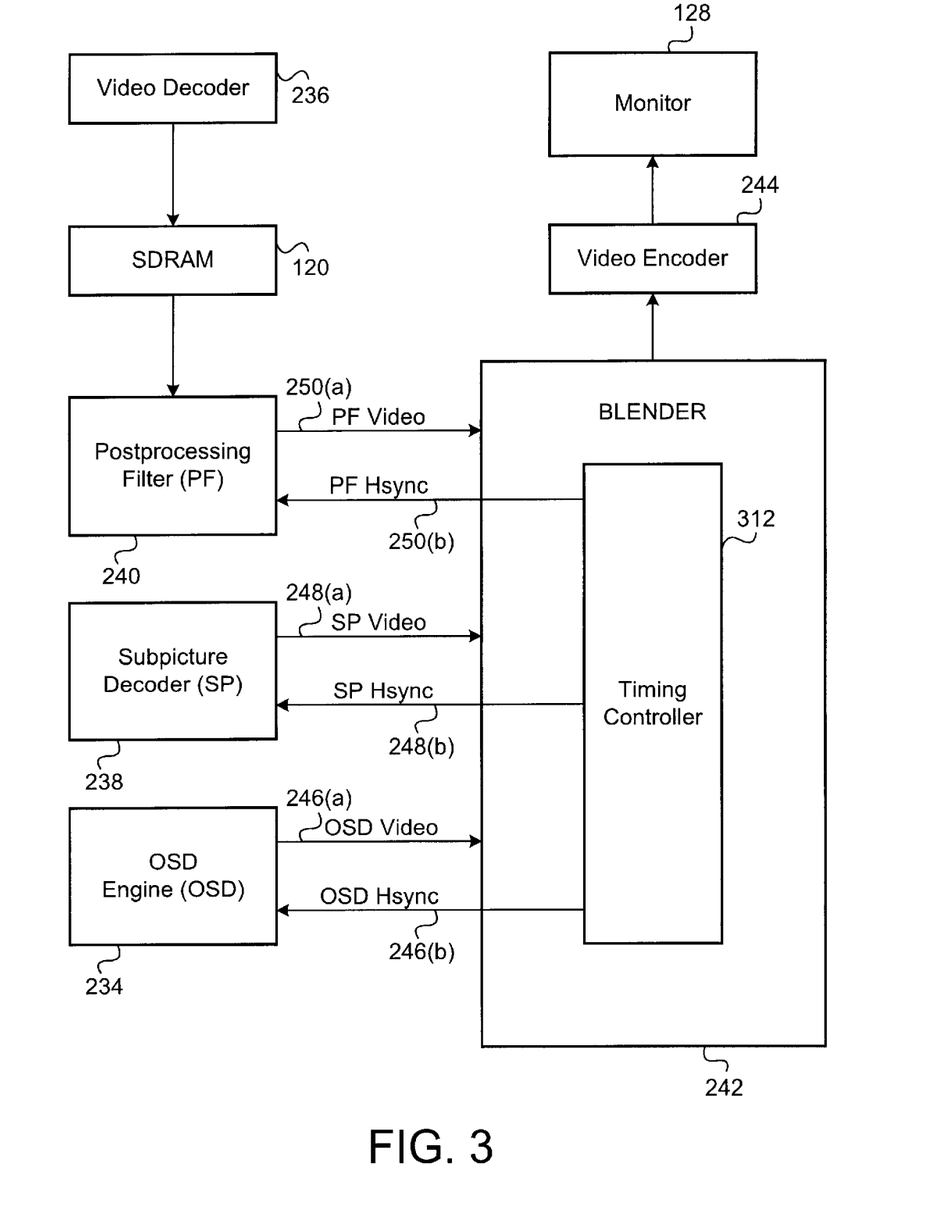
FIG. 3 is a block diagram of one embodiment for the blender of FIG. 2 and related components, in accordance with the present invention.

Referring now to FIG. 3, a block diagram of one embodiment for the FIG. 2 blender 242 and related components is shown, in accordance with the present invention. The FIG. 3 embodiment is discussed in the context of the FIG. 2 A/V controller 116, however, in alternate embodiments, blender 242 may readily be utilized in conjunction with various other types of devices and input data.

In operation of the FIG. 3 embodiment, video decoder 236 provides decoded video data via SDRAM 120 to postprocessing filter (PF) 240 which responsively generates a corresponding PF video signal that encodes a PF image plane of video information. In the FIG. 3 embodiment, the PF video signal preferably may include primary program information, such as video data for displaying a selected motion picture. Similarly, subpicture decoder (SP) 238 preferably generates a corresponding SP video signal that encodes an SP image plane of video information which may include standardized auxiliary program information, such as subtitles and other presentation information. In addition, OSD engine (OSD) 234 preferably generates proprietary auxiliary program information that encodes an OSD image plane of video information which may advantageously be utilized by a system integrator to create a unique graphical user interface (GUI)or presentation interface for system 110. In other embodiments, the present invention may readily generate various other signals using additional or different modules than those disclosed in conjunction with the FIG. 3 embodiment.

In the FIG. 3 embodiment, a timing controller 312 advantageously generates adjusted synchronization signals to postprocessing filter 240, subpicture decoder 238, and OSD engine 234. More specifically, timing controller 312 generates a PF hsync signal to postprocessing filer 240 via line 250(*b*) to synchronize the PF video signal provided from postprocessing filter 240 to blender 242 via line 250(*a*). Similarly, timing controller 312 generates an SP hsync signal to subpicture decoder 238 via line 248(*b*) to synchronize the SP video signal provided from subpicture decoder 238 to blender 242 via line 248(*a*). In addition, timing controller 312 generates an OSD hsync signal to OSD engine 234 via line 246(*b*) to synchronize the OSD video signal provided from OSD engine 234 to blender 242 via line 246(*a*). In other embodiments, timing controller 312 may readily be implemented as a separate device that is not included within blender 242 of the FIG. 3 embodiment.

In the FIG. 3 embodiment, blender 242 then selectively blends the picture element values (pixels) of the PF video signal, the SP video signal, and the OSD video signal to generate a composite blender output signal to video encoder 244. In the FIG. 3 embodiment, blender 242 preferably blends selected image planes in response to blend factors provided to blender 242 from RISC CPU 226 (FIG. 2) through control bus 224 and temporary storage registers in postprocessing filter 240. Finally, video encoder 244 responsively generates an encoded video signal to monitor 128 for display, in accordance with the present invention.

In one embodiment of the present invention, blender 242 preferably may first blend the PF video signal and the SP video signal to generate a mixer A output signal. Blender 242 may then blend the mixer A output signal with the OSD video signal to produce a blender output signal. For example, in the FIG. 3 embodiment, blender 242 may perform a blending process on the PF video signal and the SP video signal according to the following formula:

Mixer A Output=PF Video(1−α)+SP Video(α)

where α is the corresponding selected blend factor. In other embodiments, blender 242 may readily utilize various other techniques and calculations to blend image planes, in accordance with the present invention. Blender 242, in conjunction with timing controller 312, thus permits flexible composition and synchronization of selectable image planes in system 110.

Figure 4:
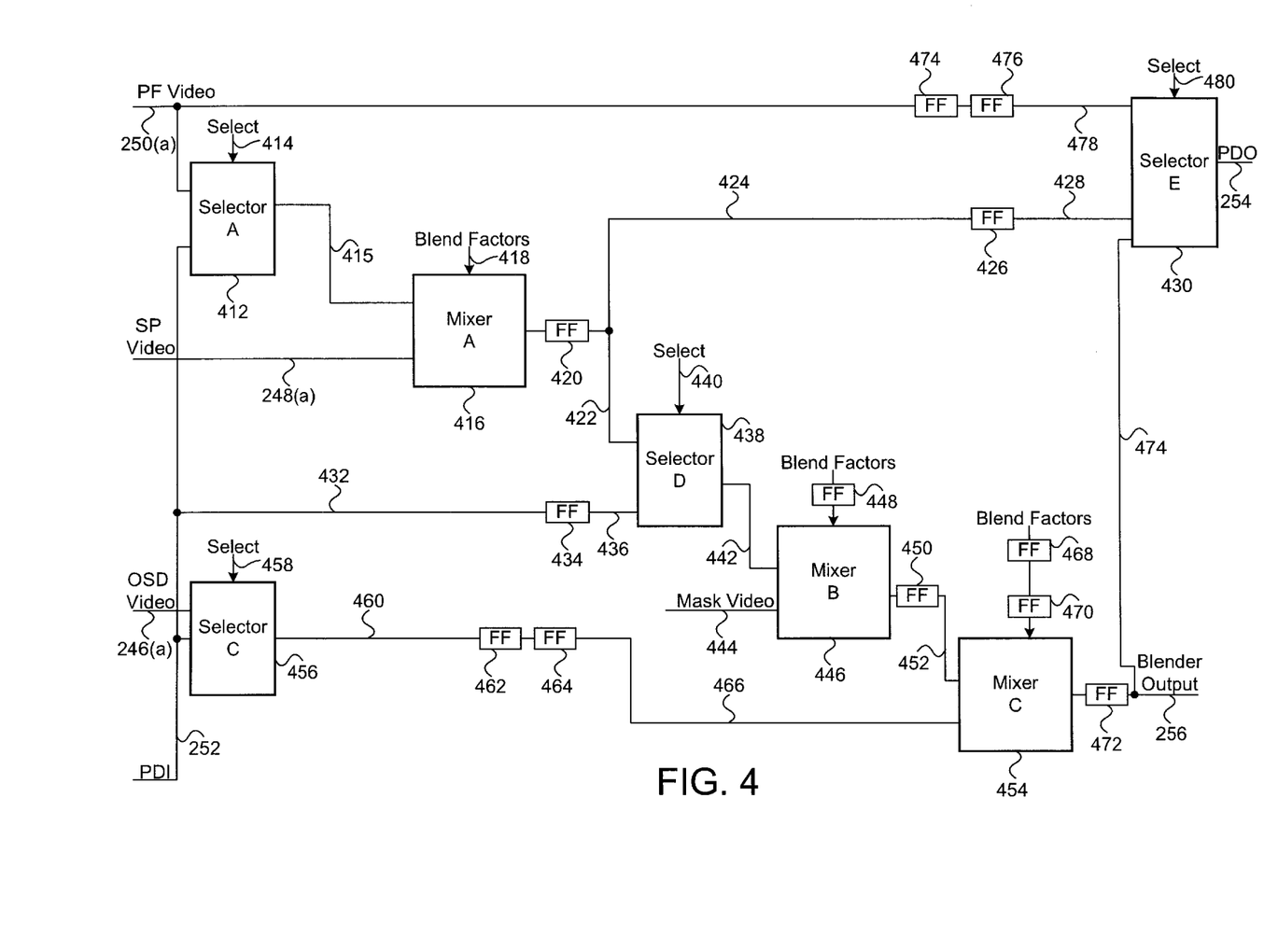
FIG. 4 is a schematic diagram of one embodiment for the blender of FIG. 3, in accordance with the present invention.

Referring now to FIG. 4, a schematic diagram of one embodiment for the FIG. 3 blender 242 is shown, in accordance with the present invention. In other embodiments, blender 242 may readily be implemented using other appropriate configurations. For example, blender 242 may blend any number of image planes, in accordance with the present invention.

In the FIG.4 embodiment, postprocessing filter 240 (FIG. 3) preferably provides a PF video signal to both a first input of selector A 412 via line 250(*a*), and also to a first input of selector E 430 via line 250(*a*). An external video signal (PDI) is preferably provided by line 252 to a second input of selector A (412). The PDI signal may be any appropriate and compatible signal from a selectable or predetermined source. The use and functionality of the PDI signal is further discussed below in conjunction with FIG. 5.

Based upon a select signal preferably originated by RISC CPU 226 (FIG. 2) on line 414, selector A 412 responsively generates either the PF video signal or the PDI signal as a selector A output signal to a first input of mixer A 416 via line 415. Subpicture decoder 238 (FIG. 3) preferably provides an SP video signal to a second input of mixer A 416 via line 248(*a*). In response to selectable blend factors (as discussed above) on line 418, mixer A 416 responsively generates a blend of the selector A output signal and the SP video signal as a mixer A output signal to a first input of selector D 438 via line 422. Mixer A 416 also provides the mixer A output signal to a second input of selector E 430 via lines 424 and 428.

Selector D 438 also receives the PDI signal at a second input via lines 252, 432, and 436. Based upon a select signal preferably originated by RISC CPU 226 (FIG. 2) on line 440, selector D 438 responsively generates either the mixer A output signal or the PDI signal as a selector D output signal to a first input of mixer B 446 via line 442.

In the FIG. 4 embodiment, a mask video signal is preferably provided to a second input of mixer B via line 444. The mask video signal may be any appropriate video information for use with blender 242. For example, the mask video signal may include a stationary frame of black pixel information to be used for effects such as fading to or from a black screen on monitor 128. A selector masking effect is also possible, such as a video frame with a small rectangle of video information that can be expanded to occupy an entire video frame. In response to selectable blend factors (as discussed above) supplied through flipflop 448, mixer B 446 responsively generates a blend of the selector D output signal and the mask video signal as a mixer B output signal to a first input of mixer C 454 via line 452.

In the FIG. 4 embodiment, OSD engine 234 (FIG. 3) preferably provides an OSD video signal to a first input of selector C 456 via line 246(*a*). Similarly, the PDI signal is provided to a second input of selector C 456 via line 252. Based upon a select signal preferably originated by RISC CPU 226 (FIG. 2) on line 458, selector C 456 responsively generates either the OSD video signal or the PDI signal as a selector C output signal to a second input of mixer C 454 via lines 460 and 466. In response to selectable blend factors (discussed above) supplied through flipflops 468 and 470, mixer C 454 responsively generates a blend of the mixer B output signal and the selector C output signal as a blender output signal to video encoder 244 (FIG. 3) via line 256.

Selector E 430 also receives the blender output signal at a third input via line 474, and responsively generates either the PF video signal, the mixer A output signal or the blender output signal as a pseudo output signal (PDO) via line 254, based on a select signal preferably originated by RISC CPU 226 (FIG. 2) on line 480. The utilization of the PDO signal is further discussed below in conjunction with FIG. 5.

Figure 5:
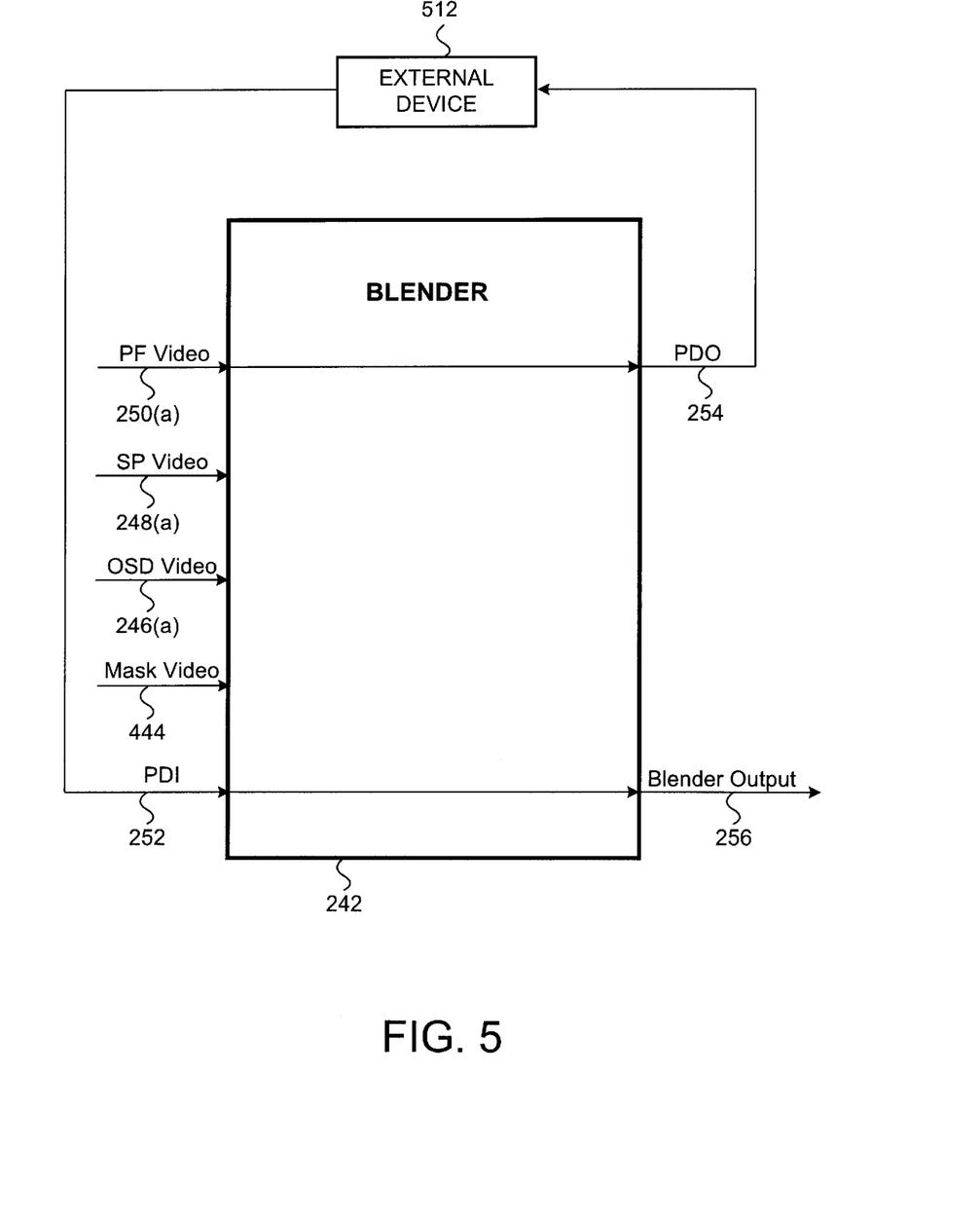
FIG. 5 is a block diagram for one embodiment of a feedback loop using the blender of FIG. 4, in accordance with the present invention.

Referring now to FIG. 5, a block diagram for one embodiment of a feedback loop using the FIG. 4 blender 242 is shown, in accordance with the present invention. In the FIG. 5 embodiment, postprocessing filter 240 provides a PF video signal to blender 242 on line 250(*a*). Blender 242 responsively transmits the PF video signal (blended or unblended) to generate a PDO signal to at least one selectable external device 512 via line 254. External device 512 may be implemented to include any appropriate and compatible functionality. For example, external device 512 may include high-performance noise reduction capabilities, image enhancement, or image sharpening components.

External device 512 preferably processes the received PDO signal to generate a PDI signal that is provided to blender 242 on line 252. Blender 242 responsively transmits the PDI signal (blended or unblended) to generate a blender output signal on line 256, in accordance with the present invention. Similarly, SP video on line 248(*a*), OSD video on line 246(*a*), or mask video on line 444 may be transmitted to the PDO output on line 254 to create a similar feedback loop to PDI input on line 252.

In alternate embodiments, external sources like an external subpicture module, an external graphic module, or an external masking plane may be supplied directly to the PDI input via line 252 without utilizing a feedback loop from the PDO output on line 254. The PDI signal on line 252 thus provides significantly increased flexibility and functionality in system 110.

Figure 6:
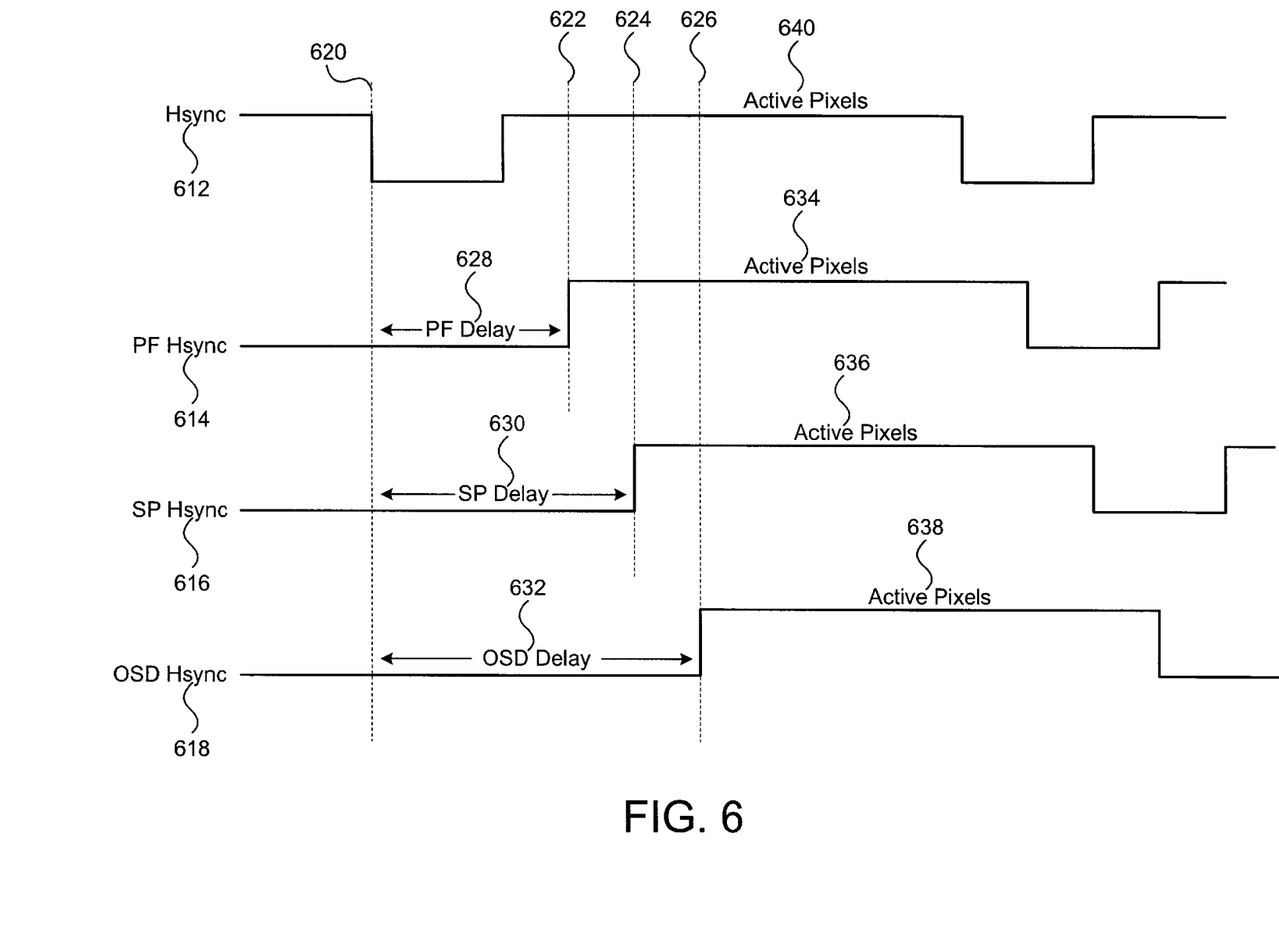
FIG. 6 is a waveform diagram for one embodiment of the timing controller of FIG. 3, in accordance with the present invention.

Referring now to FIG. 6, a waveform diagram for one embodiment of the FIG. 3 timing controller 312 is shown, in accordance with the present invention. In other embodiments of the present invention, waveforms for timing controller 312 may include various other different or additional waveforms. In the FIG. 6 embodiment, timing controller 312 initially accesses a master horizontal synchronization signal (hsync) 612 that provides a reference for synchronizing horizontal scan lines of active pixels displayed on monitor 128 of system 110. In alternate embodiments, timing controller 312 may similarly access various other timing signals that are internal or external to system 110.

In the FIG. 6 embodiment, timing controller 312 is programmed with a PF delay value 628 from RISC CPU 226 through control bus 224 and postprocessing filter 240. Timing controller 312 responsively generates a PF hsync signal 614 that is temporally offset relative to master hsync 612. PF hsync signal 614 preferably synchronizes a PF video active pixel region 634 which is delayed from the leading edge of master hsync 612 by the programmed PF delay value 628. Timing controller 312 preferably provides the generated PF hsync signal 614 to postprocessing filter 240 which responsively synchronizes the PF video signal to the PF hsync signal 614 received from timing controller 312.

Similarly, timing controller 312 is programmed with an SP delay value 630 from RISC CPU 226 through control bus 224 and postprocessing filter 240. Timing controller 312 responsively generates an SP hsync signal 616 that is temporally offset relative to master hsync 612. SP hsync signal 616 preferably synchronizes an SP video active pixel region 636 that is delayed from the leading edge of master hsync 612 by the programmed SP delay value 630. Timing controller 312 preferably provides the generated SP hsync signal 616 to subpicture decoder 238 which responsively synchronizes the SP video signal to the SP hsync signal 616 received from timing controller 312.

In addition, timing controller 312 is programmed with an OSD delay value 632 from RISC CPU 226 through control bus 224 and postprocessing filter 240. Timing controller 312 responsively generates an OSD hsync signal 618 that is temporally offset relative to master hsync 612. OSD hsync signal 618 preferably synchronizes an OSD video active pixel region 638 which is delayed from the leading edge of master hsync 612 by the programmed OSD delay value 632. Timing controller 312 preferably provides the generated OSD hsync signal 618 to OSD 234 which responsively synchronizes the OSD video signal to the OSD hsync signal 618 received from timing controller 312.

Timing controller 312 thus generates adjusted timing signals for advantageously adjusting the relative synchronization of various signals that are subsequently processed by blender 242 to form a single blender output signal. Due to the flexible selection, blending, and feedback techniques utilized by blender 242, each blender input signal (here, PF video, SP video, OSD video, and PDI video) may travel through various routing paths that each typically possess significantly different propagation times. By programming timing controller 312 with the appropriate delay signals, timing controller 312 may then pre-adjust the relative timing of the blender input signals to compensate for variations in propagation delay of system 110 (especially in blender 242). Blender 242 may thus generate a blender output signal that includes each selected and blended input signal combined in accurate synchronization for display on monitor 128.

Figure 7:
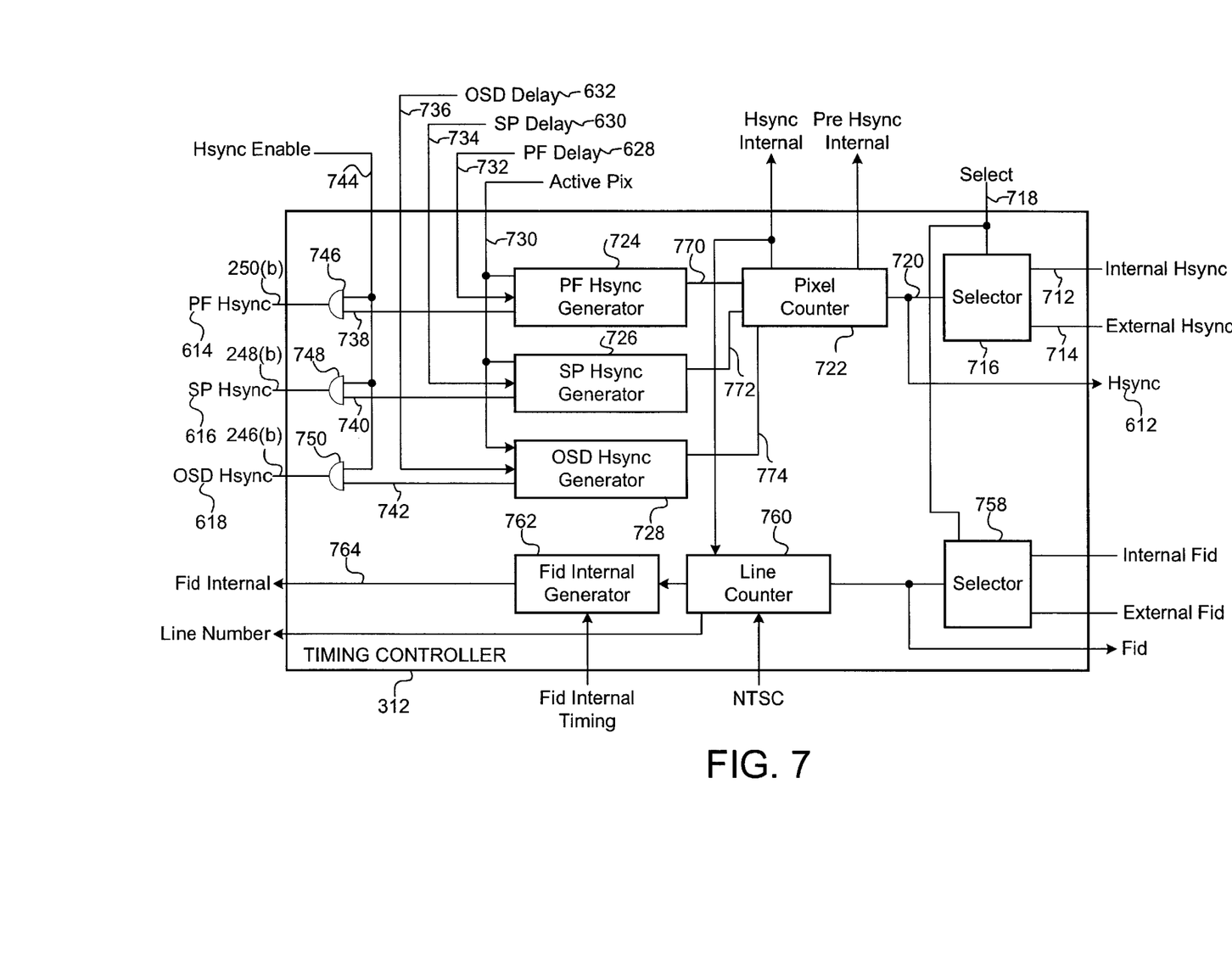
FIG. 7 is a schematic diagram for one embodiment of the timing controller of FIG. 3, in accordance with the present invention.

Referring now to FIG. 7, a schematic diagram for one embodiment of the FIG. 3 timing controller 312 is shown, in accordance with the present invention. In the FIG. 7 embodiment, a selector (or similar multiplexer-type device) 716 selects either an internally-generated horizontal synchronization signal (internal hsync) on line 712, or selects an externally-provided hsync signal on line 714 to generate a master hsync signal 612 to pixel counter 722 via line 720. In response, pixel counter 722 preferably generates a similar but separate pixel counter output signal (referenced to the master hsync signal) to each of PF hsync generator 724 via line 770, SP hsync generator 726 via line 772, and OSD hsync generator 728 via line 774.

In the FIG. 7 embodiment, PF hsync generator 724, SP hsync generator 726, and OSD hsync generator 728 each receive active pixel (active pix) information via line 730. PF hsync generator 724 also receives a PF delay signal 628 on line 732, and responsively generates a PF hsync signal 614 to postprocessing filter 240 via line 738, gate 746, and line 250(b). Similarly, SP hsync generator 726 receives an SP delay signal 630 on line 734, and responsively generates an SP hsync signal 616 to subpicture decoder 238 via line 740, gate 748, and line 248(b).

In addition, OSD hsync generator 728 receives an OSD delay signal 632 on line 736, and responsively generates an OSD hsync signal 618 to OSD engine 234 via line 742, gate 750, and line 246(b). In the FIG. 7 embodiment, timing controller 312 also preferably includes other circuitry, including line counter 760 and fid internal generator 762 to generate a video field signal on line 764.

In the FIG. 7 embodiment, RISC CPU 226 or another controller device may therefore program timing controller 312 with selectable delay values to allow timing controller 312 to reshape a master synchronization signal, and thus advantageously compensate for image plane synchronization discrepancies in the output signal of blender 242.

Figure 8:
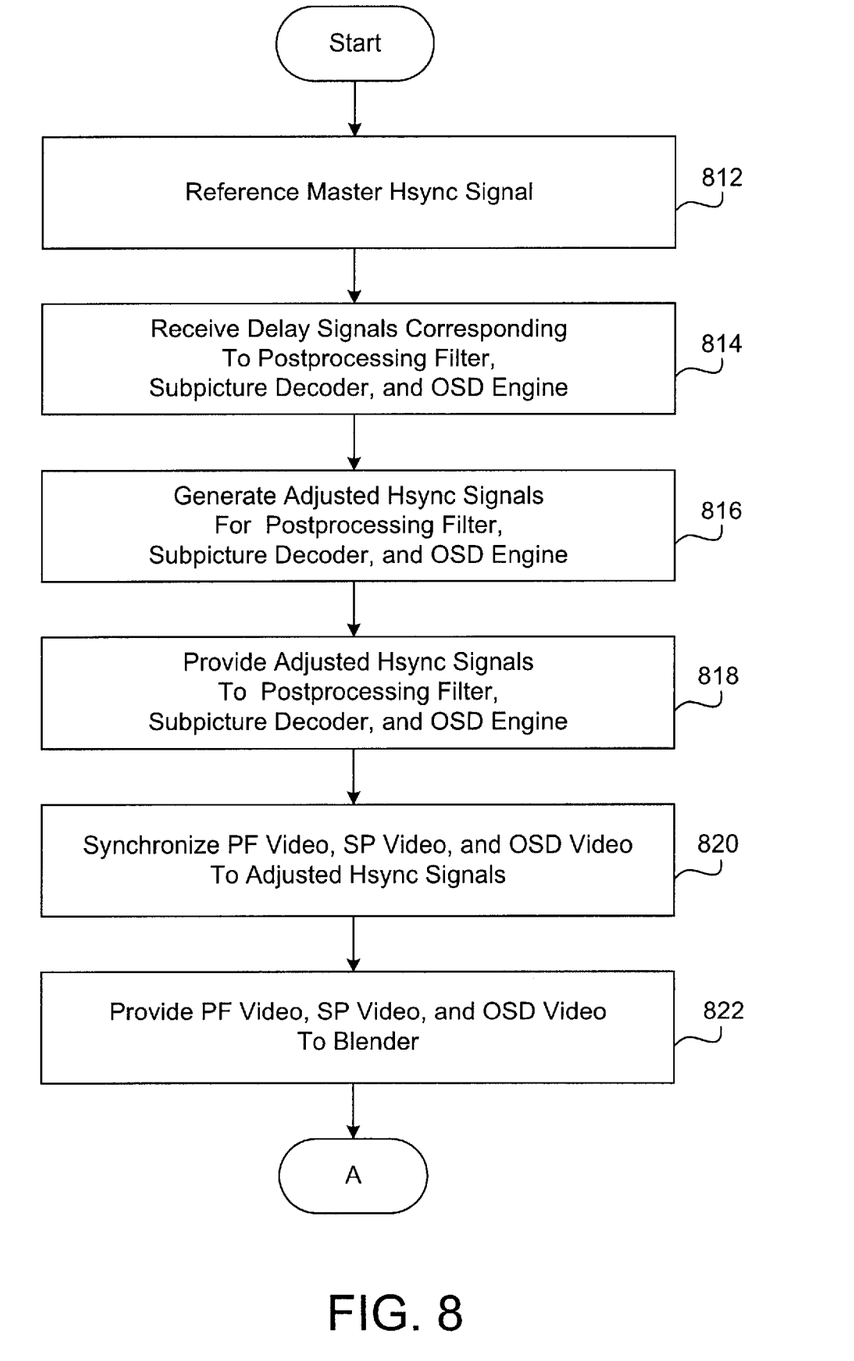
FIG. 8 is a flowchart of method steps for controlling the timing of the blender circuit of FIG. 3, in accordance with one embodiment of the present invention.

Referring now to FIG. 8, a flowchart of method steps for controlling the timing of the FIG. 3 blender 242 is shown, in accordance with one embodiment of the present invention. In the FIG. 8 embodiment, initially, in step 812, timing controller 312 accesses and references a master hsync signal 612. In alternate embodiments, various other signals may readily be utilized by timing controller 312 as a reference.

In step 814, timing controller 312 receives a PF delay signal 628, an SP delay signal 630, and an OSD delay signal 632. In other embodiments, timing controller 312 may readily receive various other additional or different delay signals. In step 816, timing controller 312 preferably generates reshaped or adjusted hsync signals corresponding to the received delay signals. Specifically, timing controller 312 generates a PF hsync signal 614 in response to PF delay signal 628. Timing controller 312 similarly generates an SP hsync signal 616 in response to SP delay signal 630, and also generates an OSD hsync signal 618 in response to OSD delay signal 632.

In step 818, timing controller 312 provides the adjusted hsync signals to corresponding modules in system 110. More specifically, timing controller 312 provides PF hsync signal 614 to postprocessing filter 240, SP hsync signal 616 to subpicture decoder 238, and OSD hsync signal 618 to OSD engine 234. In alternate embodiments, adjusted synchronization signals may readily be provided to various other modules and devices, in accordance with the present invention.

In step 820, postprocessing filter 240 pre-synchronizes the PF video signal using the received PF hsync signal 614.

Similarly, subpicture decoder 238 pre-synchronizes the SP video signal using the received SP hsync signal 616. Likewise, OSD engine 234 pre-synchronizes the OSD video signal using the received OSD hsync signal 618.

Finally, in step 822, postprocessing filter 240 provides the pre-synchronized PF video signal to blender 242. Similarly, subpicture decoder 238 provides the pre-synchronized SP video signal to blender 242, and OSD engine 234 provides the pre-synchronized OSD video signal to blender 242. The FIG. 8 timing process then terminates, and the present invention advances to the process of FIG. 9.

Figure 9:
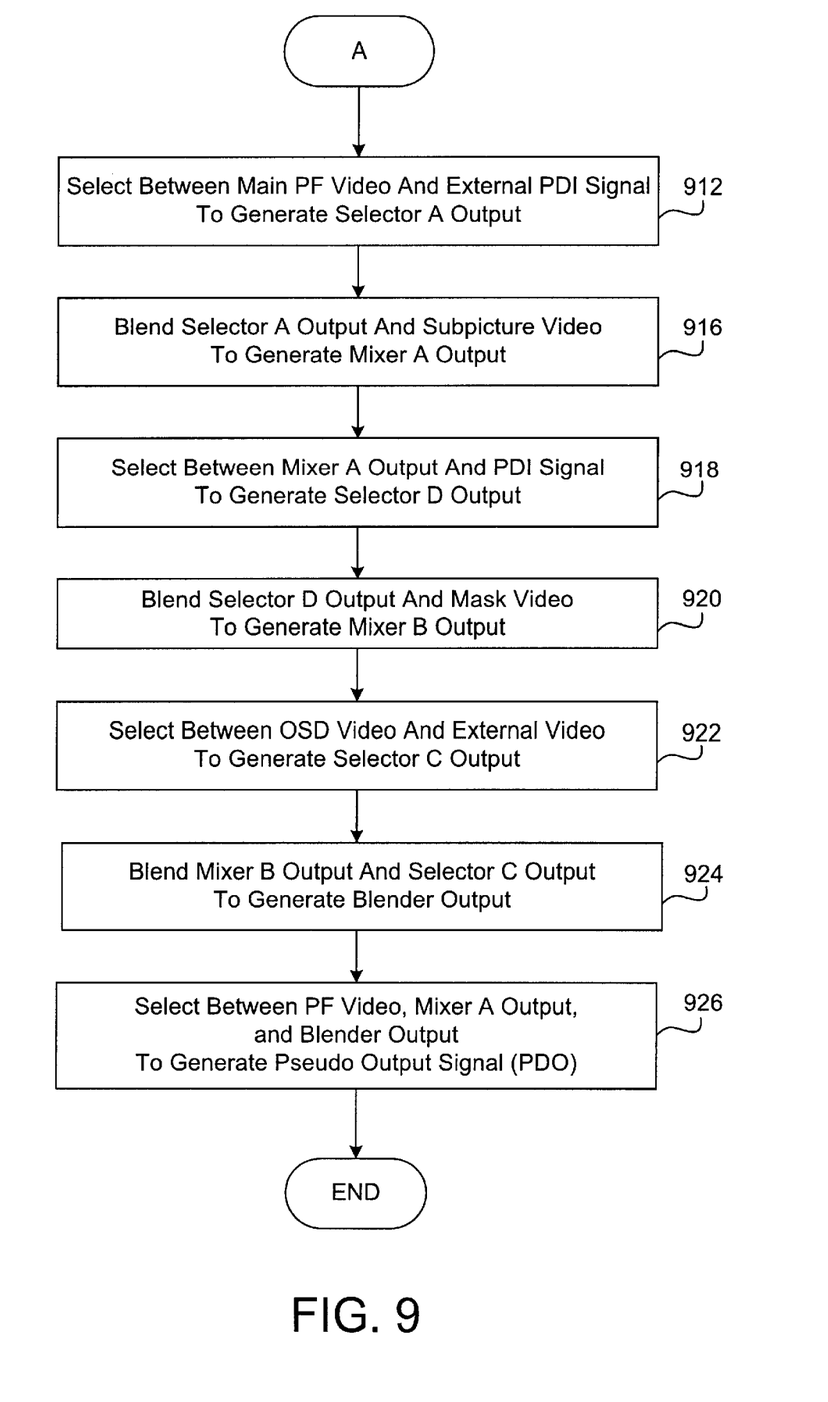
FIG. 9 is a flowchart of method steps for flexibly blending multiple image planes, in accordance with one embodiment of the present invention.

Referring now to FIG. 9, a flowchart of method steps for flexibly blending multiple image planes is shown, in accordance with one embodiment of the present invention. In the FIG. 9 embodiment, initially, in step 912, blender 242 selects between a main PF video signal and an external PDI signal to generate a selector A output signal.

Then, in step 916, blender 242 blends the selector A output signal and a subpicture SP video signal in response to configurable blend factors to generate a mixer A output signal. Next, in step 918, blender 242 selects between the mixer A output signal and the external PDI signal to generate a selector D output signal. Blender 242, then, in step 920, blends the selector D output signal and a mask video signal in response to configurable blend factors to generate a mixer B output signal.

In step 922, blender 242 selects between an OSD video signal and the external PDI signal to generate a selector C output signal. Then, in step 924, blender 242 blends the mixer B output signal and the selector C output signal in response to configurable blend factors to generate a synchronized blender output signal, in accordance with the present invention. Finally, in step 926, blender 242 selects between the main PF video, the mixer A output signal, and the blender output signal to generate a pseudo output signal (PDO).

In accordance with the present invention, the FIG. 9 embodiment presents one sequence of possible methods steps performed by blender 242. However, in alternate embodiments, blender 242 may readily perform method steps that are different from, in addition to, or in varying order from those disclosed in conjunction with the FIG. 9 embodiment. The embodiments of FIGS. 8 and 9 thus teach improved techniques for synchronizing and flexibly blending multiple image planes in system 110.

The invention has been explained above with reference to a preferred embodiment. Other embodiments will be apparent to those skilled in the art in light of this disclosure. For example, the present invention may readily be implemented using various hardware and software configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for manipulating information signals, comprising:
    a timing controller, coupled to said system, to generate synchronization signals for pretiming said information signals to compensate for signal synchronization discrepancies between said information signals; and
    a blender, coupled to said system, for flexibly blending said information signals according to one or more blend factors to thereby produce a composite signal, said system further comprising a postprocessing filter that generates a PF video signal, a subpicture decoder that generates an SP video signal, and an OSD engine that generates an OSD video signal.

2. The system of claim 1 wherein said blender routes said PF video signal, said SP video signal, and said OSD video signal through separate signal paths, each of said signal paths having a different propagation delay that creates said signal synchronization discrepancies in said blender.

3. The system of claim 1 wherein said timing controller accesses and references a master synchronization signal.

4. The system of claim 3 wherein a processor provides programmable delay signals of selectable duration to said timing controller, said delay signals including a PF delay signal, an SP delay signal, and an OSD delay signal.

5. The system of claim 4 wherein said timing controller generates adjusted synchronization signals based on said master synchronization signal and said delay signals, said adjusted synchronization signals including a PF synchronization signal provided to said postprocessing filter, an SP synchronization signal provided to said subpicture decoder, and an OSD synchronization signal provided to said OSD engine.

6. The system of claim 5 wherein said postprocessing filter synchronizes said PF video signal using said PF synchronization signal, said subpicture decoder synchronizes said SP video signal using said SP synchronization signal, and said OSD engine synchronizes said OSD video signal using said OSD synchronization signal.

7. The system of claim 1 wherein said blender selects between said PF video signal and an external PDI signal to generate a selector A output signal.

8. A system for manipulating information signals, comprising:
    a timing controller, coupled to said system, to generate synchronization signals for pretiming said information signals to compensate for signal synchronization discrepancies between said information signals; and
    a blender, coupled to said system, for flexibly blending said information signals according to one or more blend factors to thereby produce a composite signal, said blend factors being provided to said blender by a reduced-instruction set controller through a control bus and registers in a postprocessing filter, said blender combining pairs of said information signals to generate a blended signal according to the following formula:

Blended Signal=Data A(1−α)+Data B(α)

where data A is a first information signal, data B is a second information signal, and α is a blend factor.

9. The system of claim 7 wherein said blender blends said selector A output signal and said SP video signal to generate a mixer A output signal.

10. The system of claim 9 wherein said blender selects between said mixer A output signal and said external PDI signal to generate a selector D output signal.

11. The system of claim 10 wherein said blender blends said selector D output signal and a mask video signal to generate a mixer B output signal.

12. The system of claim 11 wherein said mask video signal is used for video effects, including fading in, fading out, and selector masking effects.

13. The system of claim 11 wherein said blender selects between an OSD video signal and said external PDI signal to generate a selector C output signal.

14. The system of claim 13 wherein said blender blends said mixer B output signal and said selector C output signal to generate a blender output signal.

15. The system of claim 14 wherein said blender selects between said PF video signal, said mixer A output signal, and said blender output signal to generate a PDO signal.

16. The system of claim 15 wherein said blender provides said PDO signal to an external device that manipulates said PDO signal to produce said external PDI signal which is then provided in a feedback loop to said blender.

17. A method for manipulating information signals, comprising the steps of:

generating synchronization signals with a timing controller for pretiming said information signals to compensate for signal synchronization discrepancies between said information signals; and blending said information signals according to one or more blend factors by using a blender to thereby flexibly produce a composite signal, said system further comprising a postprocessing filter that generates a PF video signal, a subpicture decoder that generates an SP video signal, and an OSD engine that generates an OSD video signal.

18. The method of claim 17 wherein said blender routes said PF video signal, said SP video signal, and said OSD video signal through separate signal paths, each of said signal paths having a different propagation delay that creates said signal synchronization discrepancies in said blender.

19. The method of claim 17 wherein said timing controller accesses and references a master synchronization signal.

20. The method of claim 19 wherein a processor provides programmable delay signals of selectable duration to said timing controller, said delay signals including a PF delay signal, an SP delay signal, and an OSD delay signal.

21. The method of claim 20 wherein said timing controller generates adjusted synchronization signals based on said master synchronization signal and said delay signals, said adjusted synchronization signals including a PF synchronization signal provided to said postprocessing filter, an SP synchronization signal provided to said subpicture decoder, and an OSD synchronization signal provided to said OSD engine.

22. The method of claim 21 wherein said postprocessing filter synchronizes said PF video signal using said PF synchronization signal, said subpicture decoder synchronizes said SP video signal using said SP synchronization signal, and said OSD engine synchronizes said OSD video signal using said OSD synchronization signal.

23. The method of claim 22 wherein said postprocessing filter synchronizes said PF video signal, said subpicture decoder synchronizes said SP video signal, and said OSD engine synchronizes said OSD video signal to produce a synchronized composite blender output signal.

24. A method for manipulating information signals, comprising the steps of:

generating synchronization signals with a timing controller for pretiming said information signals to compensate for signal synchronization discrepancies between said information signals; and blending said information signals according to one or more blend factors by using a blender to thereby flexibly produce a composite signal, said blend factors being provided to said blender by a reduced-instruction set controller through a control bus and registers in a postprocessing filter, said blender combining pairs of said information signals to generate a blended signal according to the following formula:

$$\text{Blended Signal} = \text{Data A}(1-\alpha) + \text{Data B}(\alpha)$$

where data A is a first information signal, data B is a second information signal, and $\alpha$ is a blend factor.

25. The method of claim 17 wherein said blender selects between said PF video signal and an external PDI signal to generate a selector A output signal.

26. The method of claim 25 wherein said blender blends said selector A output signal and said SP video signal to generate a mixer A output signal.

27. The method of claim 25 in which said external PDI signal is selected from a group that includes an external graphics generator, an external effects device, an external video source, and an external mask source.

28. The method of claim 26 wherein said blender selects between said mixer A output signal and said external PDI signal to generate a selector D output signal.

29. The method of claim 28 wherein said blender blends said selector D output signal and a mask video signal to generate a mixer B output signal.

30. The method of claim 29 wherein said mask video signal is used for video effects, including fading in, fading out, and selector masking effects.

31. The method of claim 29 wherein said blender selects between an OSD video signal and said external PDI signal to generate a selector C output signal.

32. The method of claim 31 wherein said blender blends said mixer B output signal and said selector C output signal to generate a blender output signal.

33. The method of claim 32 wherein said blender selects between said PF video signal, said mixer A output signal, and said blender output signal to generate a PDO signal.

34. The method of claim 33 wherein said blender provides said PDO signal to an external device that manipulates said PDO signal to produce said external PDI signal which is then provided in a feedback loop to said blender.

35. The method of claim 34 in which said external device is one of a group that includes a noise-reduction module, a image enhancement module, and a video sharpening module.

* * * * *